Nov. 28, 1967  G. W. YOUNGER  3,354,536
METHOD OF REPAIRING SPLINED COUPLINGS
Filed July 8, 1965  3 Sheets-Sheet 1
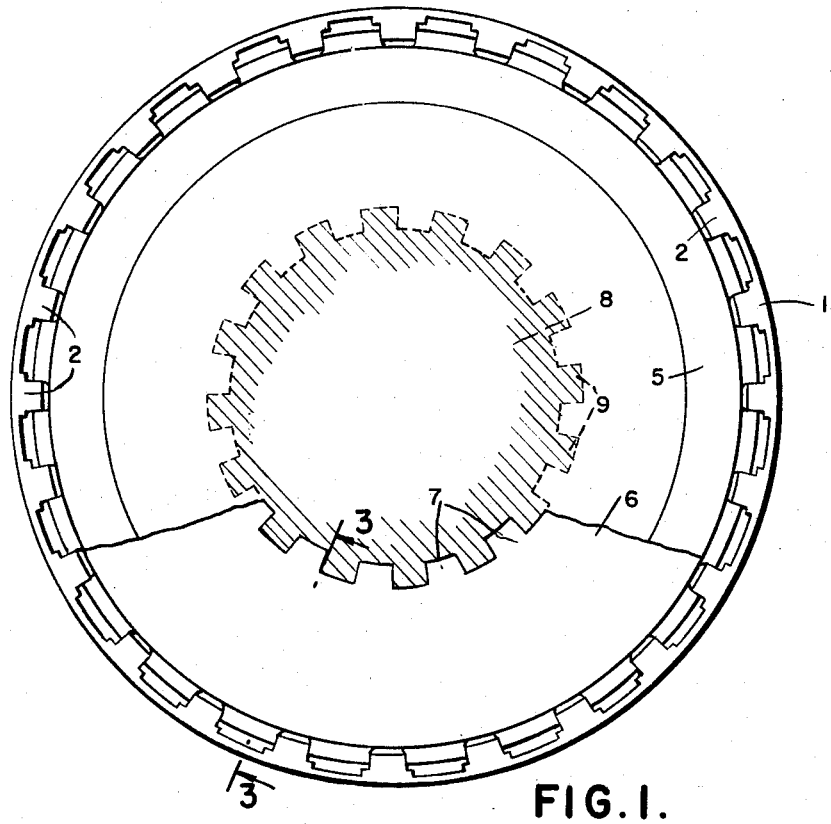
FIG. I.
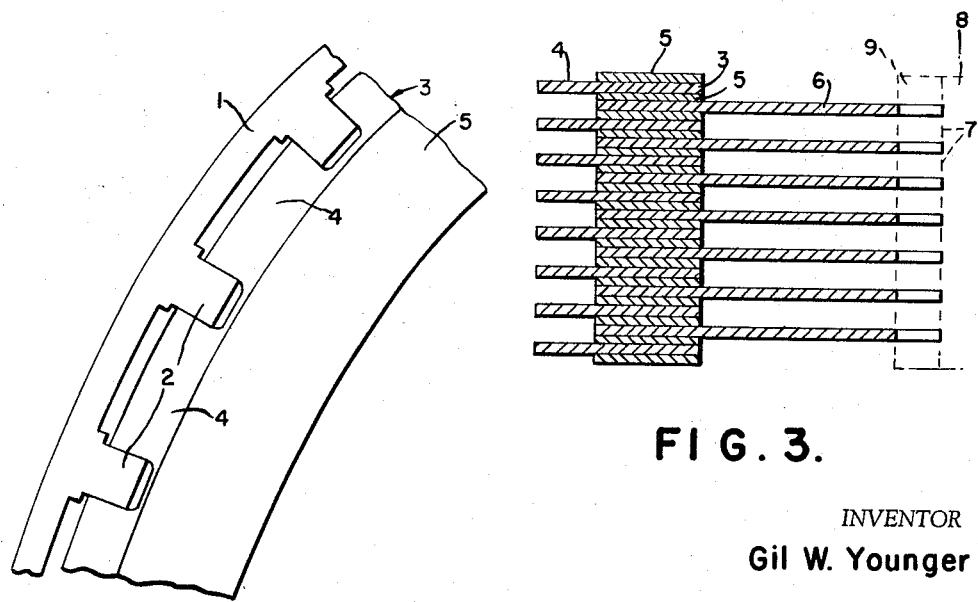
FIG. 2.
FIG. 3.
INVENTOR
Gil W. Younger
BY J. Hanson Boyden
ATTORNEY

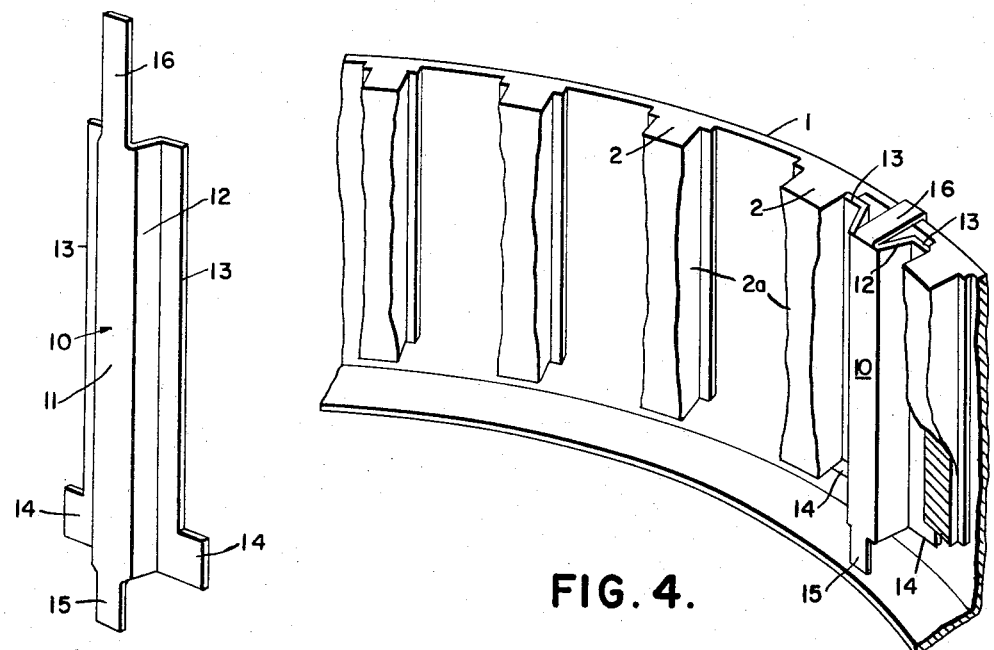
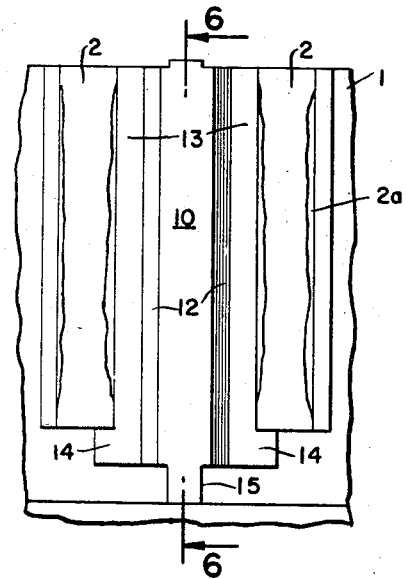
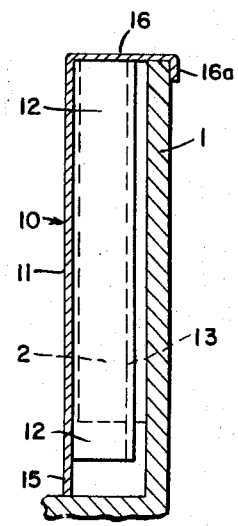
FIG. 7.  FIG. 4.  FIG. 5.  FIG. 6.
INVENTOR
Gil W. Younger
BY J. Hanson Boyden
ATTORNEY Nov. 28, 1967 G. W. YOUNGER 3,354,536
METHOD OF REPAIRING SPLINED COUPLINGS
Filed July 8, 1965 3 Sheets-Sheet 3

INVENTOR
Gil W. Younger

BY  *J. Hanson Boyden*

ATTORNEY 3,354,536
METHOD OF REPAIRING SPLINED COUPLINGS
Gil W. Younger, 2626 Del Vista Place,
Hacienda Heights, Calif. 91745
Filed July 8, 1965, Ser. No. 470,503
6 Claims. (Cl. 29—401)

This invention relates to splined couplings, and more particularly to a method of repairing such couplings as have become worn.

A common form of such couplings comprises a circular base member having internal radially projecting splines formed integral therewith, and a ring shaped mating member or members having peripheral external matching teeth constructed to engage these splines.

Heretofore, when a base unit with the internal splines became worn, it was necessary to discard the whole unit and replace it with a new one. These cast metal splined units are relatively expensive.

The general object of the invention is to save the expense of replacing the entire splined unit, and to this end the invention provides additional insertable splines so constructed that they can be mounted in the spaces between the sides of the worn original splines and used in place of the original splines.

The externally toothed cooperating mating member or members, having teeth cut to match the new splines, can be produced at relatively low cost, and can be inexpensively provided to replace the original toothed member or members.

The additional insertable splines can be manufactured in various ways, such as being extruded, forged, machined from stock, or by stamping. I have successfully produced them by stamping from sheet metal.

Splined couplings are used in numerous applications, such as motor vehicle axles, oil well equipment, power plants and automobile automatic transmissions. In many cases, the internally splined circular base unit forms a part of the hydraulic transmission, and in some instances the splined coupling drives through a friction clutch, closely associated therewith. It is this latter type of mechanism which I have selected to use as an illustration, in explaining the principles of the invention.

In order that the invention may be readily understood, reference is had to the accompanying drawings, forming part of this specification, and in which:

FIG. 1 is a plan view of a splined coupling comprising the base unit and the matching toothed members, as well as part of the associated "clutch pack," the latter being broken away, and the externally splined driven shaft being indicated in broken lines;

FIG. 2 is a fragmentary plan view of the splined base unit and toothed members on an enlarged scale;

FIG. 3 is a transverse section on an enlarged scale along the line 3—3 of FIG. 1, looking in the direction of the arrows;

FIG. 4 is a fragmentary perspective view looking at the inside of the splined base unit, and showing one of my novel insertable splines in position;

FIG. 5 is a fragmentary elevational view showing the insertable spline in position.

FIG. 6 is a transverse section on the line 6—6 of FIG. 5, looking in the direction of the arrows;

FIG. 7 is a perspective view of one of the insertable splines itself, as it appears before being mounted in the base unit;

Figure 10:
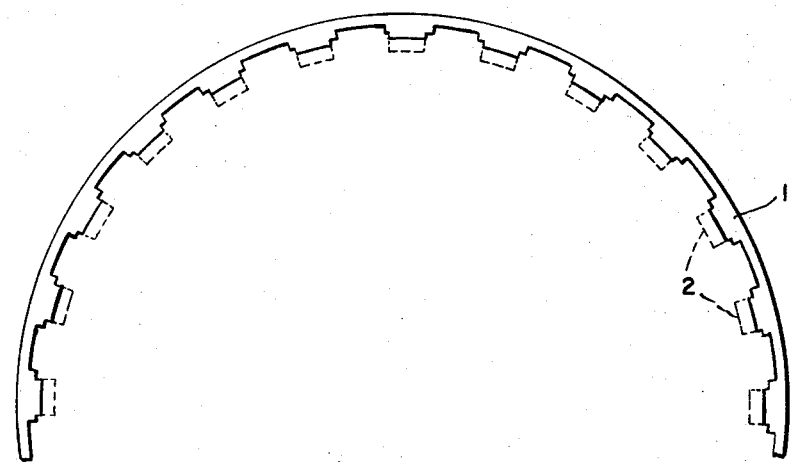
FIG. 10 is a fragmentary plan view somewhat similar to FIG. 1, but showing how the worn original splines can be machined away, if desired, before installing the insertable splines.

Referring to the drawings in detail, the internally splined circular member or base unit is indicated at 1. This is usually a casting having formed integral therewith a series of parallel original splines 2. This casting may form a part of a hydraulic transmission (not shown), and constitutes one member of the coupling. The other or mating member of the coupling consists of one or more rings or discs 3 having peripheral matching teeth 4, fitting between the original splines 2.

I have illustrated the rings or discs 3 as constituting part of a "clutch pack" by which power may be transmitted from the coupling. To this end, each ring or disc is covered on both sides with a friction lining 5, as best shown in FIG. 3, and interleaved between the rings or discs 3 are another set of annular discs 6, preferably made of steel, and having internally projecting teeth 7. These teeth are shown as fitting between external splines 9 on a power-take-off shaft 8.

The two sets of annular discs constituting the "clutch pack" may be pressed together axially or released either by manual or hydraulic means (not shown) and when thus pressed together they serve as a friction clutch to transmit power from the coupling to the driven shaft.

The arrangement above described forms no part of my invention, but the description is given merely to illustrate, by way of example, one mechanism to which the invention can be advantageously applied.

The original splines 2 of such couplings are subject to destructive wear by reason of the engagement of the toothed discs therewith, and eventually, even if not entirely worn away, the sides of the splines become so roughened and irregular, as shown at 2a in FIGS. 4, 5, 8 and 9, that the toothed discs cannot slide up and down freely on them (as they have to do, for example, when constituting part of a clutch, as above described). When this happens, it was necessary heretofore to discard the entire base unit, and replace it with a new one. This was expensive, especially where the unit was constructed to form part of a hydraulic transmission (as above mentioned).

The invention avoids the necessity of having to discard the base unit because the splines are worn. This is accomplished by fabricating and mounting on the unit a new set of additional splines which can be inserted in the spaces between the original splines.

FIG. 7 shows one of these new, insertable splines, formed of sheet metal, by stamping. It is a hollow, trough-shaped structure 10, having a flat face 11, beveled sides 12, and flanges 13 extending outwardly from the rear edges of the sides 12, and lying substantially in the same plane.

Figure 8:
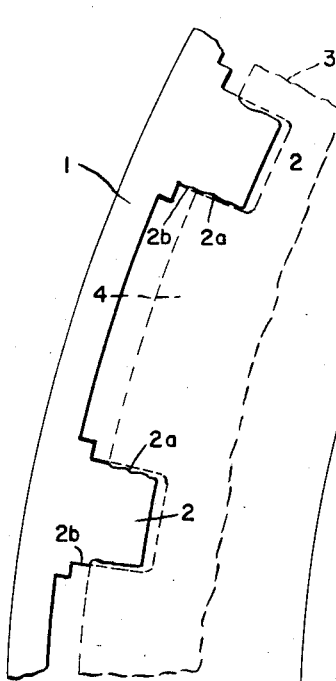
FIG. 8 is a fragmentary plan view similar to FIG. 2, but showing how the original splines are worn by engagement with the matching toothed members, the latter being illustrated in broken lines.

By reference to FIG. 8, it will be seen that the teeth 4 of the toothed members or discs 3 are not long enough to engage the full width of the sides of the original splines 2, so that when these sides become worn and rough, there still remains a narrow surface zone 2b, adjacent the wall of the circular base unit, which is unworn and in good, smooth condition.

Figure 9:
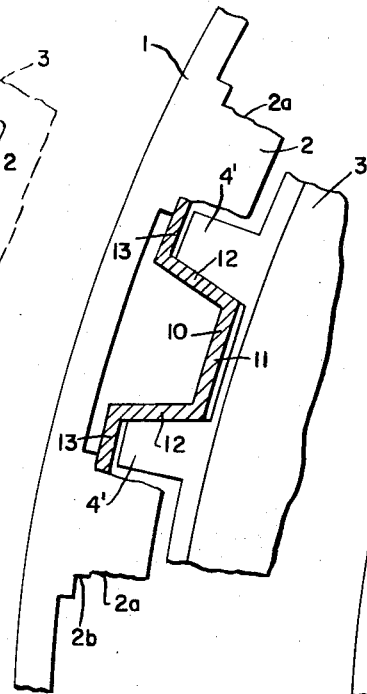
FIG. 9 is a similar view, but showing one of the insertable splines in position, and illustrating the shape of the new toothed members having teeth formed to match the insertable splines, and used to replace the original toothed members.

The outer edges or first abutment means of the flanges 13 are straight, and when the insertable spline is mounted on the base unit, these straight edges engage between and abut the smooth surface zones 2b, which face toward each other, of a pair of adjacent original splines, as shown in FIG. 9, and the additional splines are thus firmly held in the proper position.

The new insertable spline is also formed adjacent its inner end with a pair of ears or lugs 14 projecting out laterally from the flanges 13 and lying in the same plane. When installed, these lugs engage under the inner ends or first transverse surfaces of two adjacent original splines, as shown in FIG. 5, and thus lock the insertable spline against outward movement. At the same time, the insertable spline has at its lower end another lug or strut 15, adapted to rest on the bottom or second transverse surface of the base unit, and thus hold the spline against inward movement. As is apparent from FIG. 4, the inner ends of original splines 2 form a first transverse surface which faces in a direction opposite to the bottom or second transverse surface of the circular base member, and strut 15 and lugs 14 provide second abutment means engageable with these transverse surfaces to prevent axial movement of the additional splines. As shown at FIG. 4, the lugs 14, which form part of the second abutment means, have transverse upwardly facing edges which engage the transverse end surfaces of a pair of original splines 2. Finally, the new additional spline is provided at its outer end with a longitudinally extending tab 16. This is adapted to be bent over the edge of the base unit, after the spline is inserted, as shown in FIGS. 4 and 6, to hold the spline in place during the assembly operation.

To cooperate with the insertable splines, I provide a replacement set of toothed mating members or discs, having a tooth form matching that of the new splines. These are relatively inexpensive and can be produced at low cost.

Figure 11:
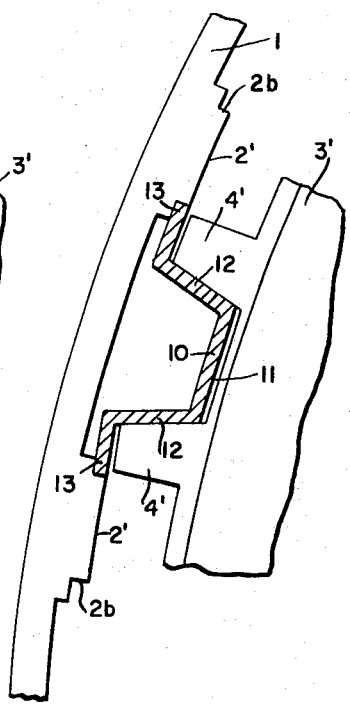
FIG. 11 is a view similar to FIG. 9 but showing an insertable spline mounted on the base unit after the original splines have been machined away.

As shown in FIGS. 9 and 11, these replacement discs 3' have pairs of teeth 4' shaped to embrace or straddle the new splines 10.

While for the sake of simplicity, I have illustrated in the drawing only a single additional insertable spline installed on the base unit, it will be understood that I contemplate mounting a complete set of new additional splines on the base unit, that is to say, a set extending all the way around the unit, with one new additional spline in the space between the adjacent sides of each pair of original splines. When thus installed, and assembled with the replacement set of discs or mating members, it will be seen that, with the construction described, the new additional splines are maintained rigidly in place and need no welding or other special securing means to hold them in position.

While I have so far described installing the insertable additional splines between the original worn splines as they are, I may, if desired, remove the original splines by machining them off before installing the new ones. This is illustrated in FIGS. 10 and 11. In FIG. 10 the original splines 2 are shown in broken lines, indicating that they have been removed. As shown in FIG. 11, the remaining part or base of the old splines is indicated at 2', the old splines having been cut away only down to the smooth zones 2b, so that the edges of the flanges 13 can still abut these smooth zones which face toward each other, as before.

While I have shown and described by new additional insertable splines as made of sheet metal, it will be understood that the invention is by no means limited to this. The splines may be produced by other methods, such as extrusion, forging, machining, etc., and the exact details and configuration of the splines may vary accordingly, so long as they fall within the scope of the appended claims.

What I claim is:

1. The method of repairing a worn splined coupling made up of a base member having integral internal, radially projecting splines, and a mating externally toothed member, the teeth of which fit between and engage the sides of said splines, thus causing wear of such sides, but which teeth are shorter than the radial dimension of said splines and hence do not engage the full depth of said splines, whereby there is a zone on the sides of each spline adjacent said base member and beyond the ends of said teeth which does not become worn, which method comprises independently fabricating a plurality of separate, insertable splines, and mounting such insertable splines in the spaces between the side faces of adjacent original splines, said insertable splines having straight side edges constructed to bear against the unworn zones of said original splines adjacent said base member.

2. The method of repairing a worn torque transmitting splined coupling made up of a circular member having a plurality of circumferentially spaced, axially extending original splines projecting radially therefrom, and a mating member having a plurality of radially projecting teeth in mesh with said splines and movable axially along said splines, the method comprising independently fabricating a plurality of additional splines of such cross-sectional configuration and width as to be accommodated between a pair of said original splines, said additional splines including abutment means engageable with the side surfaces of a pair of said original splines which face toward each other to prevent circumferential movement of said additional splines when torque is transmitted through the coupling; said method further comprising installing said additional splines between a pair of said original splines with said abutment means of each additional spline engaging the side surfaces of a different pair of said original splines of said circular member which face toward each other; connecting said additional splines to said circular member against axial movement, and providing a mating member having new teeth shaped to mesh with and engage said additional splines thus installed.

3. A method according to claim 2 particularly characterized by leaving said original splines intact so no special machine tools are required to effect the repair, and wherein the new teeth on said mating member are shaped to engage only said additional splines and not said original splines.

4. A method according to claim 2 wherein said abutment means are oppositely facing side edges of said additional splines formed integrally with the additional splines.

5. A method according to claim 2 wherein said circular member includes a first transverse surface, and a second transverse surface facing in a direction opposite to said first transverse surface and said step of fabricating said additional splines further includes providing on said additional splines second abutment means engageable with said first and second transverse surfaces to prevent axial movement of said additional splines.

6. A method according to claim 5 wherein said first transverse surface of said circular member includes end faces of said original splines, and said second abutment means of said additional splines includes laterally projecting members presenting transverse edges engageable with the end faces of the pair of original splines between which an additional spline is installed.

References Cited

UNITED STATES PATENTS

| | | | |
|---|---|---|---|
| 598,436 | 2/1898 | Perkins | 22—158 |
| 1,222,625 | 4/1917 | Hay | 74—243 |
| 1,406,110 | 2/1942 | Troutner | 29—159.2 |
| 1,736,758 | 11/1929 | Ball | 74—243 |
| 2,923,166 | 2/1960 | Brindley et al. | 74—440 X |
| 2,979,812 | 4/1961 | Russell | 29—463 |

THOMAS H. EAGER, *Primary Examiner.*